United States Patent
Biskeborn et al.

(10) Patent No.: US 9,007,718 B2
(45) Date of Patent: Apr. 14, 2015

(54) WRITE HEAD HAVING A DEVICE FOR REDUCING THE EFFECTS OF STRAY FLUX

(75) Inventors: Robert G. Biskeborn, San Jose, CA (US); Philipp Herget, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 12/776,847

(22) Filed: May 10, 2010

(65) Prior Publication Data

US 2011/0273797 A1    Nov. 10, 2011

(51) Int. Cl.
*G11B 5/17* (2006.01)
*G11B 5/40* (2006.01)
*G11B 5/008* (2006.01)
*G11B 5/31* (2006.01)

(52) U.S. Cl.
CPC .............. *G11B 5/00826* (2013.01); *G11B 5/17* (2013.01); *G11B 5/3123* (2013.01)

(58) Field of Classification Search
USPC ............... 360/123.17, 123.46, 123.11, 123.4, 360/123.01, 125.72, 125.3, 128
See application file for complete search history.

(56) References Cited

U.S. PATENT DOCUMENTS

| | | |
|---|---|---|
| 3,591,733 A | 7/1971 | Pflughaupt |
| 3,959,824 A | 5/1976 | Ohi et al. |
| 4,008,493 A | 2/1977 | Pizzuto |
| 4,072,994 A | 2/1978 | Takashima |
| 4,369,476 A | 1/1983 | Karsh |
| 4,945,439 A | 7/1990 | Sato |
| 4,962,437 A | 10/1990 | Wilcox |
| 5,239,433 A | 8/1993 | Watanabe |
| 5,255,141 A * | 10/1993 | Valstyn et al. ................ 360/321 |
| 5,461,528 A | 10/1995 | Keel et al. |
| 5,883,750 A | 3/1999 | Maurice et al. |
| 6,995,950 B2 | 2/2006 | Lairson et al. |
| 7,289,295 B2 | 10/2007 | Guan et al. |
| 7,440,213 B2 * | 10/2008 | Amin et al. ..................... 360/66 |
| 7,573,682 B2 * | 8/2009 | Pust et al. .................. 360/294.7 |
| 2003/0043490 A1 * | 3/2003 | Clinton et al. .................. 360/55 |
| 2004/0169950 A1 * | 9/2004 | Clinton et al. .................. 360/55 |
| 2005/0289577 A1 * | 12/2005 | Seigler et al. ................. 720/658 |
| 2006/0245108 A1 | 11/2006 | Hsu et al. |
| 2007/0146931 A1 | 6/2007 | Baer et al. |

FOREIGN PATENT DOCUMENTS

| | | | |
|---|---|---|---|
| JP | 57098124 A | * | 6/1982 |
| JP | 03290805 A | * | 12/1991 |
| JP | 06176422 A | * | 6/1994 |

OTHER PUBLICATIONS

Desserre et al, "New Possibilities Offered by Integrated Heads to Reduce Crossfeed (Write to Read)", IEEE Transactions on Magnetics vol. MAG-13, No. 5, p. 1469-1471, Sep. 1977.*

* cited by examiner

Primary Examiner — Julie Anne Watko
(74) Attorney, Agent, or Firm — Lieberman & Brandsdorfer, LLC (57) ABSTRACT

A magnetic write head with a flux opposing structure for opposing stray flux from an external source. The write head includes a yoke with two poles and a non-magnetic gap formed there between, and functions to write data to a magnetic storage medium. The flux opposing structure is proximate to the first pole and has a separation from an exterior surface of the first pole. A current applied to the secondary coil to create a secondary flux field with an opposite polarity of a first magnetic flux. The secondary flux field opposes the stray flux associated with the primary flux field of the magnetic write head and/or a neighboring magnetic write head.

18 Claims, 6 Drawing Sheets

WRITE HEAD HAVING A DEVICE FOR REDUCING THE EFFECTS OF STRAY FLUX

BACKGROUND

1. Technical Field

The present invention relates to magnetic write heads for writing to a magnetic storage medium. More particularly, this invention relates to reducing the effects of stray flux from an external source such as is produced by a neighboring write head.

2. Description of the Prior Art

Magnetic storage and magnetic recording are terms referring to the storage of data on a magnetic medium. In magnetic recording, magnetic patterns are recorded onto a magnetizable material to store the data. The information is accessed using one or more read/write heads. Magnetic storage devices, primarily hard disks and magnetic tape drives, are widely used to store digital information such as software, audio, and video data.

Heads for use with magnetic storage media typically include a writer and a reader that respectively record and detect magnetic domains in a medium in proximity to the head. A writer typically has a coil with one or more turns wrapped around a ferromagnetic yoke. To operate a writer, an electric current is passed through the coil, producing a magnetic field in the yoke. This magnetic field bridges a non-magnetic gap at the end of the yoke and also extends partly into the storage medium. For a perpendicular writer, a soft magnetic underlayer can be employed in the storage medium such that the write field extends between the yoke and the soft underlayer. When the write field exceeds the coercivity of the medium, the medium becomes magnetized. As the write current is reversed while the head moves over the medium, a magnetic transition is created. These transitions form the bits of digital data that are detected with the read head.

In some magnetic recording systems, such as magnetic tape drives, multiple writers are used simultaneously to enable writing data at a high data rate. The spacing between these write heads is determined by a recording format of the tape. In current products this spacing is 166.5 micro meters. Future recording formats may require heads on a tighter pitch to enable both higher areal density and higher data rate. However, there are limitations on how small the element pitch can be.

When two or more writers are in proximity, the magnetic flux generated by any writer may enter the yoke of another writer. This may degrade the quality of the patterns recorded by the magnetic writers. This coupling between writers is referred to as "crosstalk" and poses a limitation on writer pitch. Therefore, there is a need for a solution which reduces the effects of stray flux on write quality.

SUMMARY

This invention comprises a write head accessory for reducing the effects of stray magnetic flux from one or more external sources.

In one aspect of the invention, a magnetic write head is provided with a yoke having first and second poles. A magnetic connection is formed between the first and second poles at a first end of the poles. In addition, a non-magnetic gap is formed between the poles at a second end of the poles. A coil is provided and wrapped around the magnetic yoke to create a magnetic field in the non-magnetic gap positioned between the first and second poles in response to electrical current passing through the coil. A first electrically conducting structure is provided proximate to the head. This structure is configured to reduce an effect of stray flux on a field in the non-magnetic gap in response to flow of electrical current.

In another aspect of the invention, a multi-track recording head is provided with multiple proximate write transducers, each of the write transducers having at least one proximal flux reducing structure. The flux reducing structures function to reduce magnetic crosstalk between the transducers.

In yet another aspect of the invention, a tape drive system is provided with multiple write transducers that are adjacently mounted. The write transducers have one or more proximate flux reducing structures such that magnetic crosstalk is reduced to a level that does not degrade data detection on read back.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The present invention is illustrated and described using magnetic storage tape as an example. However, the invention is readily extended to other magnetic storage media, such as a magnetic hard disk drive. Tape drives differ from disk drives in the mechanisms that transport the media with respect to the write head, but both use analogous magnetic read and write devices, and so are encompassed by the teachings of the present invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A magnetic write head is employed to record data to a proximate magnetic recording medium. It is recognized in the art that multiple write heads may be employed to simultaneously write data to separate tracks present on the recording medium. There is a restriction on the size of the head itself and limited space available between adjacent write heads. It is known that stray flux can enter and alter the magnetic field of a write head. One or more electrically conducting structures are present on each write head to reduce the effects of magnetic flux received from a magnetic source external to the magnetic write head.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

The components shown in the figures are not drawn to scale in order to better illustrate features of the invention. In a typical construction, multiple write heads are adjacent to one another and densely packed to enable the heads to simultaneously write data to multiple tracks of the same magnetic storage medium.

Figure 1A:
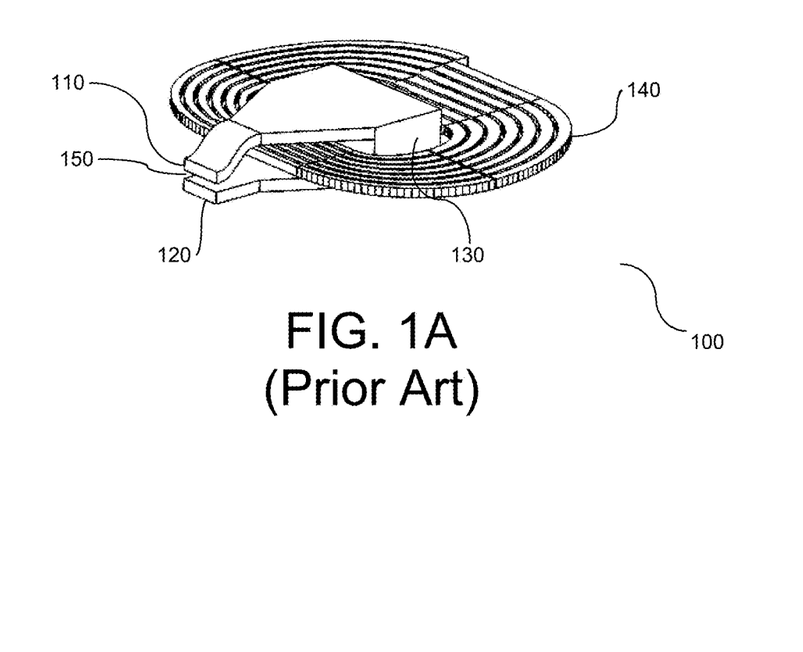
FIGS. 1A and 1B are prior art illustrations of a magnetic write head.
Figure 1B:
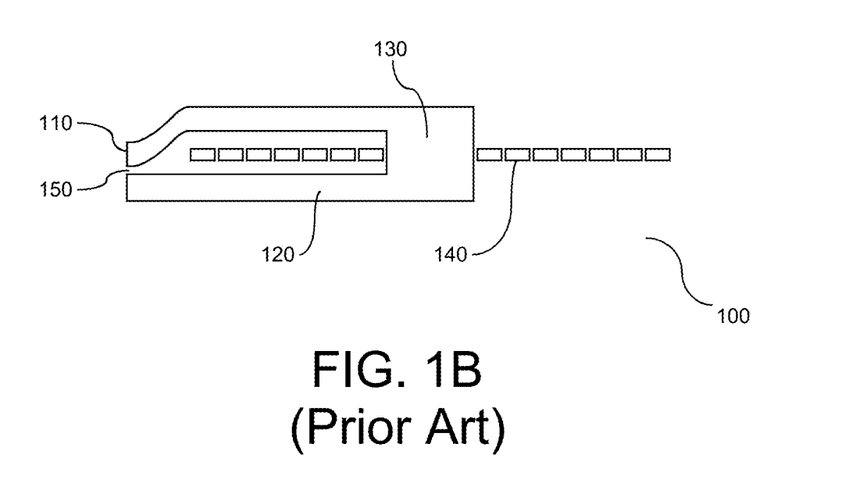

FIG. 1a shows a perspective drawing of a prior art magnetic write head and FIG. 1b shows a cross sectional view of the same head. As shown, the write head includes a yoke comprised of two poles (110) and (120) that are both magnetically connected at the back of the head (130). The two poles (110) and (120), as well as the back connection (130) are each comprised of ferromagnetic material, such as nickel, iron, and cobalt, alloys of Ni and Fe, CZT, or any other material known in the art. A coil (140) with a pancake configuration is shown surrounding the back connection (130). In one embodiment, the pancake configuration has a spiral shape. Application of an electrical current to the coil (140) creates a magnetic field. More specifically, magnetic field is guided along the two poles (110) and (120) and bridges the non-magnetic gap (150) between the poles. The magnetic field near the gap fringes into and writes to an adjacent magnetic storage medium (not shown)

Write heads such as those used in a hard disk and a tape drive, are typically fabricated using thin film processes on Alumina-Titanium Carbide (AlTiC) wafers, although other substrates and methods are known to those in the art. As part of the fabrication process, the front of the head structure is generally lapped to control the length of the poles and to form a surface over which the magnetic medium is placed. This surface is referred to as the recording surface, or lapped surface of the head.

It is well known to those in the art that magnetic flux created by a write head may stray from the vicinity of the write head. As noted above, multiple write heads are arranged on the wafer such that the spacing meets the requirements of the desired data format. One embodiment of this invention is a structure to counteract the effects caused by stray flux received from a nearby write head or other external magnetic source(s). The design of this flux opposing structure will depend on many factors. In general, one goal in designing the structure is to oppose stray flux from any area of the write head where stray flux will cause a degradation of the performance of the write head to an unacceptable level. Areas of particular concern are the front non-magnetic gap and portions of the poles exhibiting non-linear behavior during head operation. Factors that may be considered in the design of the structure include the design of the write head itself, the materials in the writer, the amount of the desired reduction of stray flux, processing capabilities, cost, and spacing between write heads, etc.

Figure 2:
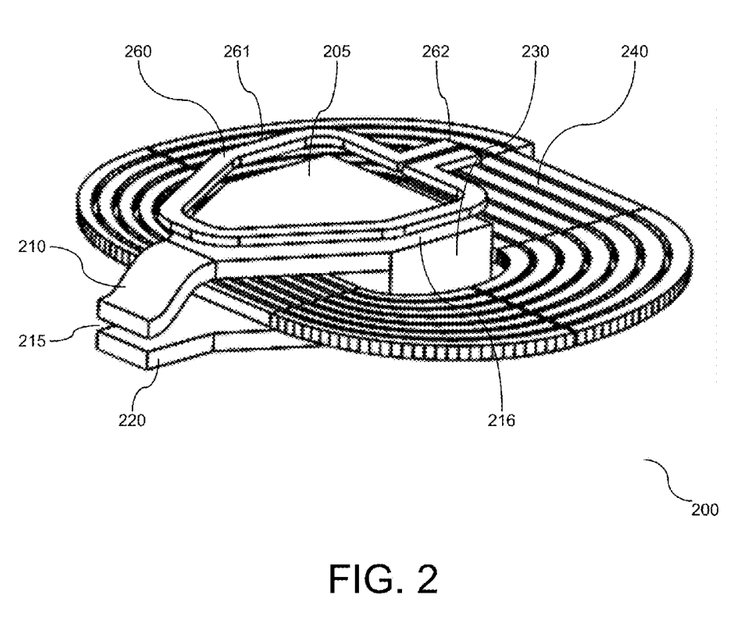
FIG. 2 is a perspective view of the magnetic write head with a mechanism to mitigate the effects of stray flux originating from an adjacent write head, according a preferred embodiment of this invention, and is suggested for printing on the first page of the issued patent.

FIG. 2 is a perspective view of one embodiment of the magnetic write head (200) with a structure that reduces the effects of stray flux originating from a nearby write head or an external source. As shown, a write head includes a yoke (205) having first and second poles (210) and (220), respectively, that are magnetically connected at the back of the head (230). A non-magnetic gap (215) is formed between the first and second poles (210) and (220), respectively. The first and second poles (210) and (220), respectively, as well as the back connection (230) are each comprised of a ferromagnetic material. In one embodiment, the poles (210) and (220), and connection (230) are comprised of an iron containing alloy, such as permalloy, sendust, etc. A coil (240) is shown surrounding the back connection (230). When electrical current is applied to the coil (240), a magnetic field is created and bridges the gap (215) that is positioned between the first and second poles (210) and (220), respectively. This magnetic field is used to write data to a magnetic recording medium (not shown) that is placed near the recording surface of the head.

An electrically conducting structure (260), also sometimes referred to herein as the secondary coil is proximate to the yoke (205) to reduce the effects of stray flux in portions of the write head. The secondary coil (260) is comprised of a body (261) and two or more wires (262) and is made of an electrically conductive material. In the particular embodiment shown in the figure, the secondary coil (260) is shown with a planar configuration and is parallel to one surface of the yoke (205) with an electrical insulator formed between the secondary coil (260) and a first surface of the yoke (205). The electrical insulator prevents the secondary coil (260) from becoming shorted by the surface of the yoke (205).

To reduce the effects of stray flux on writer performance, a current is introduced into the secondary coil (260) to create additional flux to oppose the incoming stray flux. Accordingly, the secondary coil (260) is oriented such that flux created within this coil can oppose stray flux entering the yoke (205) from a nearby write head or external source. The current needed to create the opposing flux is supplied by a driver. In one embodiment this driver applies a current of a magnitude and direction that is sufficient to counteract the effects the stray flux created by all nearby writers. This magnitude may be determined based on the direction and magnitude of the currents applied to one or more of the nearby writers. As an example, the driver may be configured to apply a current based on the current in the four nearest neighboring coils using the equation $I=K_1I_1+K_2I_2+K_3I_3+K_4I_4$, where I is the current applied to the structure, $I_1$, $I_2$, $I_3$, and $I_4$, are the currents in four nearest neighboring writers, and $K_1$, $K_2$, $K_3$, and $K_4$ are a set of constants. The constants, $K_1$, $K_2$, $K_3$, and $K_4$ can be determined theoretically or empirically using drive measurements. In other embodiments the current can depend on the current in any number of neighboring writers.

In the particular embodiment shown in the figure, the secondary coil (260) has a planar configuration that is parallel or relatively parallel to the surface (205) of the wafer. As shown in FIG. 2, the conductor of the secondary coil follows the perimeter of the top surface of the yoke (205). In another embodiment, the size and/or shape of the secondary coil (260) may be selected based on other factors including, but not limited, to the effectiveness, ease of processing, cost, etc. The configuration of the secondary coil shown in FIG. 2 is only one example and any shape that meets the design requirements may be used.

Figure 3:
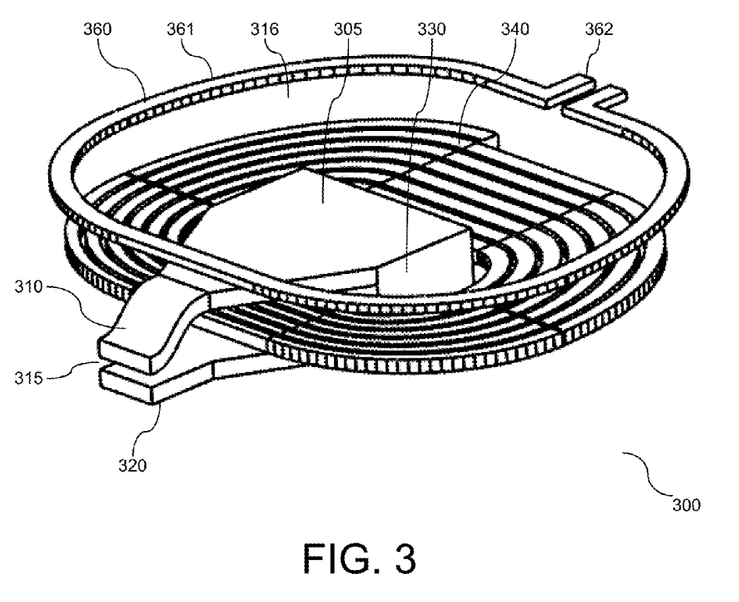
FIG. 3 is a perspective view of another embodiment of the invention showing a structure which mitigates the effects of stray flux.

In general, many different geometries of the flux canceling structure will serve the desired function, so numerous factors including cost, processing simplicity, head tape interface considerations, may be considered in choosing the structure geometry. FIG. 3 shows a perspective view of a different embodiment of the structure that illustrates another possible variation. In FIG. 3, the secondary coil (360) has a perimeter larger than the perimeter of one surface of the yoke (305).

More specifically, FIG. 3 is a perspective view of the magnetic write head (300) showing an alternative electrically conductive structure used to reduce the effects of stray flux. As shown, the write head has a yoke structure (305) having first and second poles (310) and (320), respectively, and a non-magnetic gap (315) between the poles (310) and (320). The first and second poles (310) and (320) are both magnetically connected toward the back (330) of the head. The first and second poles (310) and (320), respectively, as well as the back connection (330) are each comprised of a ferromagnetic material. In one embodiment, the yoke (305) is comprised of an iron containing alloy, such as permalloy, sendust, etc. A coil (340) is shown surrounding the back connection (330). Upon applying current to the coil (340), a magnetic field is formed in the non-magnetic gap (315). A portion of this field also enters into and writes data to the magnetic storage medium (not shown).

The electrically conducting structure (360) also referred to herein as a secondary coil, is in proximity to the yoke (305). More specifically, the secondary coil (360) is comprised of a body (361) and two or more wires (362) and is in a plane parallel to the yoke (305), with an electrical insulator (316) formed between the secondary coil (360) and the yoke (305). The secondary coil (360) is comprised of an electrically conductive material. The electrical insulator (316) prevents the secondary coil (360) from becoming shorted by the magnetic surface of the yoke (305).

The secondary coil (360) is shown herein with a circular or near-circular shape having a circumference that is geometrically similar to the circumference of the coil (340). The secondary coil (360) is also parallel to a first surface of the yoke (305) of the write head. However, in another embodiment, the secondary coil (360) may be proximate and parallel to a second surface of the yoke (305). In either of these embodiments, an electrical insulator (316) is used to prevent the secondary coil (360) from shorting.

Figure 4:
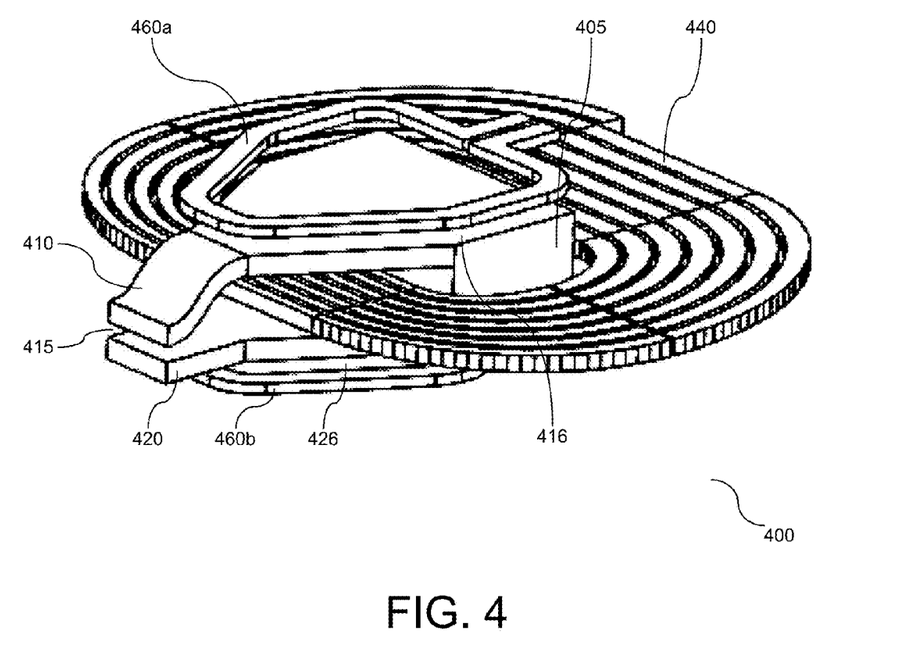
FIG. 4 is a perspective view of the magnetic write head with two structures which mitigate the effects of stray flux.

FIG. 4 is a perspective view of the magnetic write head (400) with two flux canceling mechanisms to reduce the effects of stray flux originating from a nearby write head or an external source. In this embodiment, there is a first secondary coil (460a) and a second secondary coil (460b). The first secondary coil (460a) is proximate to a first pole (410) of a yoke (405) and the second secondary coil (460b) is proximate to a second pole (420) of the yoke (405). More specifically, the first secondary coil (460a) is shown with a planar configuration and is parallel to one surface of the yoke (405) with an electrical insulator (416) formed between the first secondary coil (460a) and a first surface of the yoke (405). The electrical insulator (416) prevents a short circuit of the coil (460a). The second secondary coil (460b) is also shown with a planar configuration and is parallel to a second surface of the yoke (405) with an electrical insulator (426) formed between the second secondary coil (460b) and a second surface of the yoke (405). The electrical insulator (426) prevents a short circuit of the coil (460b).

To reduce the effects of stray flux on writer performance, a current is introduced into one or both of the first and second secondary coils (460a) and (460b) to create additional flux to oppose the incoming stray flux. Accordingly, the secondary coils (460a) and (460b) are configured with an orientation that allows current passing though the secondary coil to create flux that opposes the flux coming from a nearby write head or external source.

Figure 5:
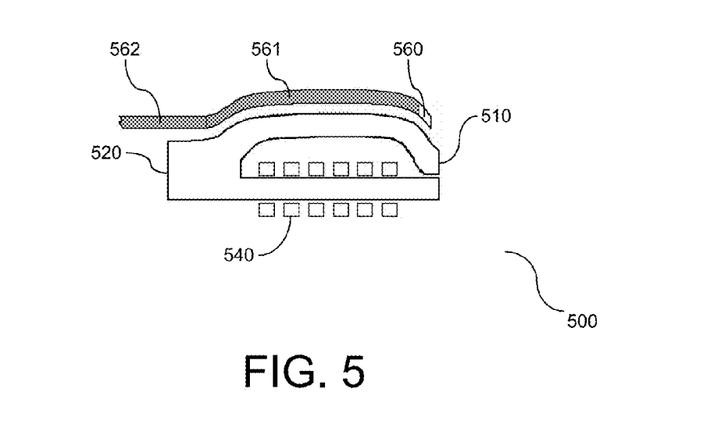
FIG. 5 is a cross section of an embodiment in which the structure which mitigates the effects of stray flux is non-planar.

FIG. 5 shows a cross section (500) of another embodiment in which the secondary coil (560) is non-planar. More specifically, the shape of the top pole (510) is non-planar and the secondary coil (560) conforms to the shape of the top pole (510). More specifically, the secondary coil (560) is comprised of a body (561) and two or more wires (562). Additionally, the secondary coil (560) in the figure is smaller than the top pole (510). Some secondary coil configurations such as a smaller coil or a conformal shape may require fewer processing steps, or provide other advantages during processing. Although only one secondary coil (560) to oppose stray flux is shown in FIG. 5, it is understood that a second secondary coil may be provided proximate to the bottom pole to oppose a sufficient amount of flux.

The embodiments of FIGS. 2-4 have a pancake coil configuration. In these configurations all of the coil turns pass around a magnetic connection in the back of the head structure and the turns lie in one or more planes. However, it is also possible to make heads with other coil configurations. The embodiment shown in FIG. 5 has coil turns (540) that are wrapped around the bottom pole (520) in a helical configuration. Although the figure shows the helical configuration together with a non-planer conformal structure, it should be understood that the invention not be limited to this combination. In general, any of the embodiments presented can be combined with any other configuration of coil turns that will enable the head to function properly.

Figure 6:
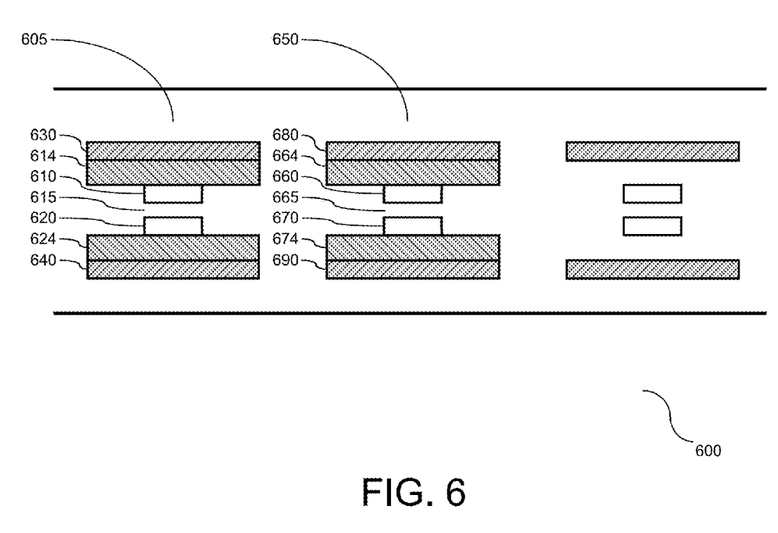
FIG. 6 is a diagram of a multi-track recording head with more than one write head, wherein the heads are aligned in a linear arrangement with each head having a structure to mitigate the effects of stray flux.

Although the descriptions in FIGS. 2, 3, 4, and 5 pertain to an individual write head, a plurality of write heads may be arranged to write data to different portions of the magnetic storage medium. The spacing of the write heads may be dictated by the desired recording format. For example, in one embodiment, 16 write heads write data to the magnetic storage medium with each write head assigned to write data to specific locations on the surface of the magnetic storage medium. FIG. 6 is a diagram (600) of a surface of a multi-track recording head showing three write heads in a linear arrangement. Each head is provided with an electrically conducting structure adjacent to at least one of its poles. In order to show the arrangement of the structures with respect to the poles, the write heads are shown in a horizontal arrangement. However, it is understood that the invention is not limited to the arrangement shown herein.

The first write head (605) is shown with two poles (610) and (620) and a non-magnetic gap (615) formed between the two poles. Each of the two poles (610) and (620) are connected to a magnetic back connection (not shown). First and second structures (630) and (640) are in proximity to each of the first and second poles (610) and (620), respectively. These structures are recessed below the surface of the recording head, and the locations are noted in the figure with shaded boxes. More specifically, a first structure (630) is in proximity to the first pole (610), and a second flux opposing structure (640) is in proximity to the second pole (620). A first electrically insulating layer (614) is positioned between the first pole (610) and the first structure (630), and a second electrically insulating layer (624) is positioned between the second pole (620) and the second structure (640). Each of the electrically insulating layers (614) and (624) function to prevent shorting of the adjacent electrically conducting structure.

The second write head (650) is shown with two poles (660) and (670) and a non-magnetic gap (665) formed between the two poles. Each of the two poles (660) and (670) are coupled to a magnetic back connection (not shown). First and second structures (680) and (690) are in proximity to each of the first and second poles (660) and (670), respectively. More specifically, a first structure (680) is proximate to the first pole (660), and a second structure (690) is proximate to the second pole (670). A first electrically insulating layer (664) is positioned between the first pole (660) and the first flux opposing structure (680), and a second electrically insulating layer (674) is positioned between the second pole (670) and the second flux opposing structure (690). As in the first write head (605), each of the electrically insulating layers (664) and (674) of the second write head (650) functions to prevent shorting of the adjacent electrically conducting structures.

Figure 7:
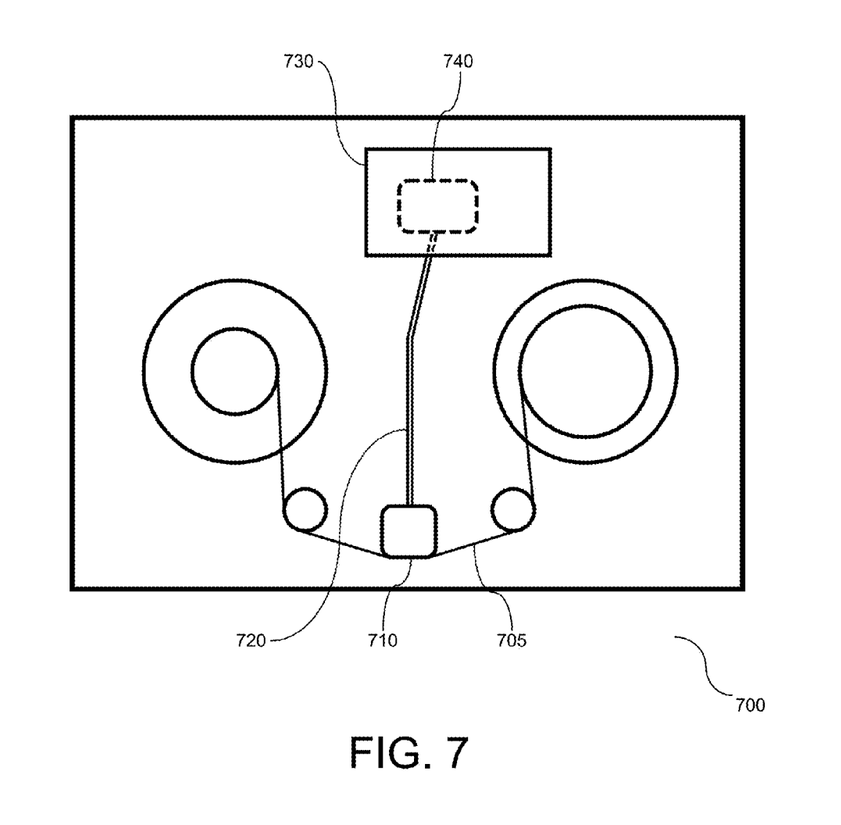
FIG. 7 is a diagram of a tape drive system with a magnetic storage medium and an array of write transducers.

FIG. 7 is a block diagram of a tape drive system (700) having a plurality of write transducers used to write data to a magnetic storage medium. In one embodiment, a center to center distance between any two adjacent write transducers is less than 166 micro meters. As shown, a magnetic storage medium (705) is transported past the recording head (710) containing a plurality of write transducers. The system also contains an electronic subsystem (730) which acts to control various components of the tape drive. A cable (720) connects the write head (710) to the read/write electronics (740) located within the electronic subsystem. The read/write electronics also contain the write drivers used to apply current to the writers. During operation, the write drivers deliver current to the write transducers, which simultaneously write data to the storage medium (705). As described above each write transducer may generate flux that may enter into nearby writers. This flux may lead to an undesired crosstalk between the transducers and degrade write quality. These undesired effects can be reduced using the various embodiments in this invention. In one embodiment, electrically conducting structures may be employed on every write transducer in the tape drive. Similarly, in another embodiment, structures may be limited to use one or more select write transducers in the tape drive system.

We claim:

1. A magnetic write structure comprising:
    a yoke having a first pole, a second pole, and a first magnetic connection between the first and second poles at a first end of the poles, and a non-magnetic gap between the poles at a second end of the poles;
    a coil having one or more turns concentrically wrapped around the magnetic yoke;
    a first electrically conducting structure positioned adjacent to one of the first and second poles of the yoke;
    the first electrically conducting structure spaced apart from the yoke by an insulating layer, the first structure substantially parallel to the poles, and spaced apart from the coil; and
    in response to flow of electrical current through the first electrically conducting structure, the first electrically conducting structure opposes stray flux associated with a flux field from an external source.

2. The magnetic write structure of claim 1, further comprising the first electrically conducting structure having a shape conformal with a shape of an adjacently positioned pole.

3. The magnetic write structure of claim 1, further comprising the head being fabricated on a wafer using a thin film process.

4. The magnetic write structure of claim 3, further comprising the first electrically conducting structure being parallel to a surface of the wafer.

5. The magnetic write structure of claim 1, further comprising the first electrically conducting structure having a body and at least two wires in contact with the body, wherein the body is contained within a length and width of the yoke.

6. The magnetic write structure of claim 1, wherein the first electrically conducting structure is comprised of a metallic material selected from the group consisting of: aluminum, copper, tantalum, and gold.

7. The magnetic write structure of claim 1, further comprising the coil having a spiral shape having at least two turns wrapped around the first magnetic connection.

8. The magnetic write structure of claim 1, further comprising the coil having at least one turn wrapped around at least one of the first and second poles.

9. The magnetic write structure of claim 1, further comprising an adjacently mounted write head.

10. The magnetic write structure of claim 1, further comprising a second electrically conducting structure positioned adjacent to one of the poles, wherein the adjacently positioned pole of the second electrically conducting structure is different than the adjacently positioned pole of the first structure.

11. A recording head comprising multiple write transducers, each of said write transducers comprising:
    a yoke have a first pole, a second pole, and a magnetic connection between the first and second poles at a first end of the poles, and a non-magnetic gap between the poles at a second end of the poles;
    a coil having one or more turns concentrically wrapped around the magnetic yoke;
    a first electrically conducting structure positioned adjacent to one of the first and second poles of the yoke;
    the first electrically conducting structure spaced apart from the yoke by an insulating layer, the first structure substantially parallel to the poles, and spaced apart from the coil; and
    in response to flow of electrical current through the first electrically conducting structure, the first electrically conducting structure reduces an effect of stray flux from an external source on a field in the non-magnetic gap between the poles at a second end of the poles.

12. The recording head of claim 11, further comprising the first electrically conducting structure to reduce the effect of stray flux generated by at least one other write transducer.

13. The recording head of claim 12, further comprising each first electrically conducting structure to reduce crosstalk between write transducers.

14. The recording head of claim 11, wherein a center to center distance between any pair of adjacent write transducers is less than 166 micrometers.

15. A magnetic recording system having electronics for writing and reading, a transport for moving a magnetic medium over a recording head, and a recording head comprising multiple write transducers, each of said write transducers comprising:

a yoke have a first pole, a second pole, and a magnetic connection between the first and second poles at a first end of the poles, and a non-magnetic gap between the poles at a second end of the poles;

a coil having one or more turns concentrically wrapped around the magnetic yoke;

a first electrically conducting structure spaced apart from the yoke by an insulating layer, the first structure substantially parallel to the poles, and separate from the coil;

in response to flow of electrical current through the first electrically conducting structure, the first electrically conducting structure reduces an effect of stray flux from an external source on a field in the non-magnetic gap between the poles at a second end of the poles; and the electronics for writing and reading applies current to each of the electrically conducting structures to reduce crosstalk between write transducers.

16. The magnetic recording system of claim 15, wherein a center to center distance between any pair of adjacent write transducers is less than 166 micrometers.

17. The magnetic recording system of claim 15, further comprising the field produced by each first electrically conducting structure to reduce the effect of stray flux generated by at least one other write transducer.

18. The magnetic recording system of claim 15, wherein the current applied to each of the electrically conducting structures is effected by the current passing through the coils of nearby writers.

* * * * *